US010728870B2

(12) United States Patent
Bhatnagar et al.

(10) Patent No.: US 10,728,870 B2
(45) Date of Patent: Jul. 28, 2020

(54) METHODS AND SYSTEMS FOR AVOIDING TRANSITIONS BETWEEN RADIO ACCESS TECHNOLOGIES WHEN PACKET DATA NETWORKS ARE INACCESSIBLE

(71) Applicant: QUALCOMM Incorporated, San Diego, CA (US)

(72) Inventors: Abhishek Bhatnagar, San Diego, CA (US); Shyamal Ramachandran, San Diego, CA (US); Vitaly Drapkin, San Diego, CA (US); Vamsi Krishna Dokku, San Diego, CA (US); Hariharan Sukumar, San Diego, CA (US); Zhong Ren, San Diego, CA (US); Vidula Rajeev Kurundkar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 14/047,673

(22) Filed: Oct. 7, 2013

(65) Prior Publication Data

US 2014/0099952 A1 Apr. 10, 2014

(30) Foreign Application Priority Data

Oct. 8, 2012 (IN) .......................... 4186/CHE/2012

(51) Int. Cl.
*H04W 60/00* (2009.01)
*H04W 48/02* (2009.01)
*H04W 88/06* (2009.01)

(52) U.S. Cl.
CPC ........... *H04W 60/00* (2013.01); *H04W 48/02* (2013.01); *H04W 88/06* (2013.01)

(58) Field of Classification Search
CPC ..................................................... H04W 60/00
(Continued)

(56) References Cited

U.S. PATENT DOCUMENTS 8,396,040 B2 3/2013 Song et al.
8,467,798 B2 6/2013 Lee et al.
(Continued)

FOREIGN PATENT DOCUMENTS

CN 101325787 A 12/2008
CN 102026319 A 4/2011
(Continued)

OTHER PUBLICATIONS

CATT: "Discussion on APN based congestion control," 3GPP Draft; C1-103995 Discussion on the APN Based Congestion Control, 3rd Generation Partnership Project (3GPP), Mobile Competence Centre; 650, Route Des Lucioles; F-06921 Sophia-Antipolis Cedex; France, vol. CT WG1, No. Barcelona; Oct. 11, 2010, Oct. 4, 2010 (Oct. 4, 2010), XP050444591.
(Continued)

*Primary Examiner* — Chuck Huynh
(74) *Attorney, Agent, or Firm* — Patterson & Sheridan, LLP

(57) ABSTRACT

Methods and apparatus are provided for avoiding attempts by a UE to attach to a RAT network when that RAT network is unavailable. According to certain aspects, the UE may detect scenarios when the RAT network is unavailable and take preemptive action to prevent the UE from attempting to acquire service on that RAT. For example, the UE may effectively remove that RAT from a list of supported RATs by sending a UE capability message indicating that RAT is not supported, which may prevent network-initiated transitions of the UE to that RAT. The UE may also remove the
(Continued)

unavailable RAT from an internal list of supported RATs, which may prevent UE-initiated transitions to that RAT.

18 Claims, 6 Drawing Sheets

(58) Field of Classification Search
USPC .................................................. 455/435.2
See application file for complete search history.

(56) References Cited

U.S. PATENT DOCUMENTS

| | | | |
|---|---|---|---|
| 8,494,528 B2 | 7/2013 | Jokinen et al. | |
| 8,504,017 B1* | 8/2013 | Hietalahti | H04W 48/18 455/426.1 |
| 8,948,750 B1* | 2/2015 | Carames | H04W 8/12 455/418 |
| 2009/0318116 A1 | 12/2009 | Kim | |
| 2010/0144307 A1* | 6/2010 | Wu | H04W 48/18 455/404.1 |
| 2012/0218889 A1* | 8/2012 | Watfa et al. | 370/230 |
| 2012/0307621 A1 | 12/2012 | Zawaideh et al. | |
| 2013/0078989 A1* | 3/2013 | Kubota | H04W 48/12 455/422.1 |
| 2013/0182563 A1 | 7/2013 | Johansson et al. | |
| 2013/0210442 A1 | 8/2013 | Aoyagi et al. | |
| 2013/0315072 A1* | 11/2013 | Hietalahti | H04W 76/02 370/242 |

FOREIGN PATENT DOCUMENTS

| | | |
|---|---|---|
| CN | 103369605 A | 10/2013 |
| EP | 2194744 A1 | 6/2010 |
| EP | 2263412 A1 | 12/2010 |
| EP | 2475213 A2 | 7/2012 |
| JP | 2006005772 A | 1/2006 |
| JP | 2009500882 A | 1/2009 |
| JP | 2012044271 A | 3/2012 |
| JP | 2012147436 A | 8/2012 |
| WO | WO-2006138019 A2 | 12/2006 |
| WO | WO-2012085158 A1 | 6/2012 |

OTHER PUBLICATIONS

International Search Report and Written Opinion—PCT/US2013/063795—ISA/EPO—dated Dec. 12, 2013.

* cited by examiner

METHODS AND SYSTEMS FOR AVOIDING TRANSITIONS BETWEEN RADIO ACCESS TECHNOLOGIES WHEN PACKET DATA NETWORKS ARE INACCESSIBLE

CROSS-REFERENCE TO RELATED APPLICATIONS

The present patent application claims priority to INDIAN Patent Application No. 4186/CHE/2012, filed Oct. 8, 2012, assigned to the assignee of the present application and hereby expressly incorporated by reference in its entirety.

FIELD OF THE DISCLOSURE

Certain aspects of the present disclosure generally relate to wireless communications and, more particularly, to methods and systems for avoiding transitioning between radio access technologies (RATs) when packet data networks (PDNs) are inaccessible.

BACKGROUND OF THE DISCLOSURE

Wireless communication networks are widely deployed to provide various communication services such as voice, video, packet data, messaging, and broadcast services. These wireless communication networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

As wireless communication technology advances, a growing number of different radio access technologies are being utilized. For instance, many geographic areas are now served by multiple wireless communication systems, each of which can utilize one or more different radio access technologies (RATs). In order to increase versatility of UEs in such systems, there recently has been an increasing trend toward multi-mode UEs that are able to operate in networks using multiple different types of RATs. For example, a multi-mode UE may be able to operate in Global System for Mobile Communications (GSM) or Universal Mobile Telecommunication System (UMTS) systems, as well as long term evolution (LTE) systems.

While allowing a UE to operate across systems with different RATs helps enhance service coverage, switching between such systems may present a challenge, for example, due to different operating requirements.

SUMMARY OF THE DISCLOSURE

Certain aspects of the present disclosure provide a method for wireless communications by a user equipment (UE) capable of communicating in at least first and second radio access technology (RAT) networks. The method generally includes detecting a scenario in which the UE is unable to acquire service in the first RAT network and preventing the UE from attempting to attach to the first RAT network based at least in part on the detection of the scenario by transmitting a message.

Certain aspects of the present disclosure provide an apparatus for wireless communications by a user equipment (UE) capable of communicating in at least first and second radio access technology (RAT) networks. The apparatus generally includes at least one processor configured to detect a scenario in which the UE is unable to acquire service in the first RAT network and prevent the UE from attempting to attach to the first RAT network based at least in part on the detection of the scenario by transmitting a message.

Certain aspects of the present disclosure provide an apparatus for wireless communications by a user equipment (UE) capable of communicating in at least first and second radio access technology (RAT) networks. The apparatus generally includes means for detecting a scenario in which the UE is unable to acquire service in the first RAT network and means for preventing the UE from attempting to attach to the first RAT network based at least in part on the detection of the scenario by transmitting a message.

Certain aspects of the present disclosure provide a program product for wireless communications by a user equipment (UE) capable of communicating in at least first and second radio access technology (RAT) networks. The program product generally comprises a computer readable medium having instructions stored thereon for detecting a scenario in which the UE is unable to acquire service in the first RAT network and preventing the UE from attempting to attach to the first RAT network based at least in part on the detection of the scenario by transmitting a message.

Various aspects and features of the disclosure are described in further detail below.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
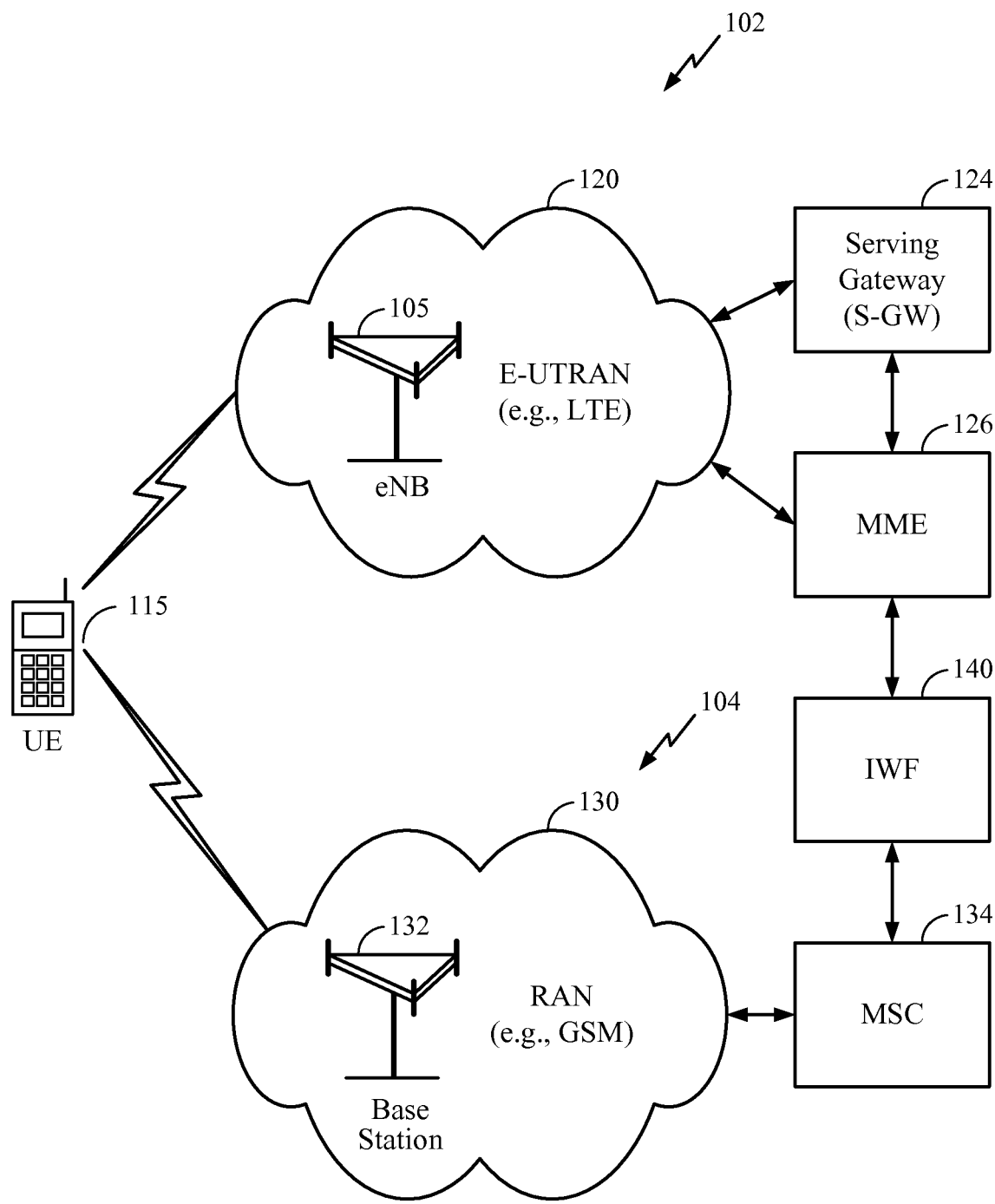
FIG. 1 illustrates an exemplary wireless communication system, in accordance with an aspect of the present disclosure.

In some RAT networks, a UE registers for service via a procedure known as an attach procedure. During this procedure, an identifier (ID) of the UE is verified and used to confirm subscription for services, such as packet switched (PS) data and voice services. Thus, the term attach generally refers registering for service in a network. In some cases, the attach procedure may fail, for example, when no packet data networks (PDNs) are available to provide certain services requested by the UE.

Aspects of the present disclosure may allow a UE to avoid attempting to access a first RAT network when the UE detects conditions that indicate the attach procedure would fail. In some cases, the techniques may be applied to prevent a transition (e.g., reselection or handover) from a second RAT network to the first RAT network, in cases where the PDNs are not accessible (e.g., an access point name (APN) of the PDN is blocked) would only result in a transition back to the second RAT network. In accordance with aspects of the present disclosure, the first RAT network may be an LTE network, while the second RAT network may be GSM or Universal Mobile Telecommunication System (UMTS) network.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

A base station ("BS") may comprise, be implemented as, or known as NodeB, Radio Network Controller ("RNC"), Evolved NodeB (eNodeB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A user equipment (UE) may comprise, be implemented as, or known as an access terminal, a subscriber station, a subscriber unit, a remote station, a remote terminal, a mobile station, a user agent, a user device, user equipment, a user station, or some other terminology. In some implementations, mobile station may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

An Example Wireless Communication System

FIG. 1 illustrates an exemplary wireless communication system in accordance with an aspect of the present disclosure. An evolved universal terrestrial radio access network (E-UTRAN) 120 may support LTE and may include user equipments (UEs) 115, a number of evolved Node Bs (eNBs) 105 and other network entities that can support wireless communication for the UEs 115.

As will be described in further detail below, techniques presented herein may help a UE 115 avoid attempting to access the E-UTRAN network 120 when packet data networks (PDNs) are inaccessible. In some cases, PDNs may be temporarily unavailable or the access point names (APNs) used to identify those PDNs may be blocked. As used herein, an APN is referred to as blocked when an attach request for that APN is rejected. In such cases, that APN is temporarily blocked for a period of time specified in the rejection message.

Each eNB 105 may provide communication coverage for a particular geographic area. The term "cell" can refer to a coverage area of an eNB and/or an eNB subsystem serving this coverage area. A serving gateway (S-GW) 124 may communicate with E-UTRAN 120 and may perform various functions such as packet routing and forwarding, mobility anchoring, packet buffering, initiation of network-triggered services, etc. A mobility management entity (MME) 126 may communicate with E-UTRAN 120 and serving gateway 124 and may perform various functions such as mobility management, bearer management, distribution of paging messages, security control, authentication, gateway selection, etc. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

A radio access network (RAN) 130 may support GSM and may include a number of base stations 132 and other network entities that can support wireless communication for UEs. A mobile switching center (MSC) 134 may communicate with the RAN 130 and may support voice services, provide routing for circuit-switched calls, and perform mobility management for UEs located within the area served by MSC 134. Optionally, an inter-working function (IWF) 140 may facilitate communication between MME 126 and MSC 134 (e.g., for 1×CSFB).

E-UTRAN 120, serving gateway 124, and MME 126 may be part of an LTE network 102. RAN 130 and MSC 134 may be part of a GSM network 104. For simplicity, FIG. 1 shows only some network entities in the LTE network 102 and the GSM network 104. The LTE and GSM networks may also include other network entities that may support various functions and services.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs (different RAT networks). A network utilizing a particular RAT is referred to herein as a RAT network or simply a Radio Access Network (RAN). Thus, RAN refers to a network, while RAT refers to a type of technology that network uses.

A UE 115 may be stationary or mobile and may also be referred to as a mobile station, a terminal, an access terminal, a subscriber unit, a station, etc. UE 115 may be a cellular phone, a personal digital assistant (PDA), a wireless modem, a wireless communication device, a handheld device, a laptop computer, a cordless phone, a wireless local loop (WLL) station, etc.

Upon power up, UE 115 may search for wireless networks from which it can receive communication services. If more than one RAT network is detected, then a RAT network with the highest priority may be selected to serve UE 115 and may be referred to as the serving RAT network. UE 115 may perform registration with the serving RAT network, if necessary. UE 115 may then operate in a "connected mode" to actively communicate with the serving RAT network. Alternatively, UE 115 may operate in an "idle mode" and camped on the serving RAT network if active communication is not required by UE 115.

UE 115 may be located within the coverage of cells of multiple frequencies and/or multiple RATs while in the idle mode. For LTE, UE 115 may select a frequency and a RAT to camp on based on a priority list. This priority list may include a set of frequencies, a RAT associated with each frequency, and a priority of each frequency.

For example, the priority list may include three frequencies X, Y and Z. Frequency X may be used for LTE and may have the highest priority, frequency Y may be used for GSM and may have the lowest priority, and frequency Z may also be used for GSM and may have medium priority. In general, the priority list may include any number of frequencies for any set of RATs and may be specific for the UE location. UE 115 may be configured to prefer LTE, when available, by defining the priority list with LTE frequencies at the highest priority and with frequencies for other RATs at lower priorities, e.g., as given by the example above.

UE 115 may operate in the idle mode as follows. UE 115 may identify all frequencies/RATs on which it is able to find a "suitable" service cell coverage in a normal scenario or an "acceptable" service cell coverage in an emergency scenario. UE 115 may then camp on the frequency/RAT with the highest priority among all identified frequencies/RATs. UE 115 may remain camped on this frequency/RAT until either (i) the frequency/RAT is no longer available with receive signal strength at a predetermined threshold or (ii) another frequency/RAT with a higher priority reaches a suitable signal strength. This operating behavior for UE 115 in the idle mode is described in 3GPP TS 36.304, entitled "Evolved Universal Terrestrial Radio Access (E-UTRA); User Equipment (UE) procedures in idle mode," which is publicly available.

UE 115 may be able to receive packet-switched (PS) data services from LTE network 102 and may camp on the LTE network 102 while in the idle mode. LTE network 102 may have limited or no support for voice-over-Internet protocol (VoIP) service, which may often be the case for early deployments of LTE networks. Due to the limited VoIP service support, UE 115 may be transferred to another RAT network for voice calls. This transfer may be referred to as circuit-switched (CS) fallback. UE 115 may be transferred to a RAT that can support voice service such as 1×RTT, WCDMA, GSM, UMTS, etc. For call origination with CS fallback, UE 115 may initially become connected to a source RAT network (e.g., LTE) that may not support voice service. The UE may originate a voice call with this source RAT network and may be transferred to a different RAT network (e.g., a target RAT network) that can support the voice call. For example, the UE may be transferred from the source RAT network to the target RAT network via higher-layer signaling for various procedures, e.g., connection release with redirection, PS handover, etc.

Figure 2:
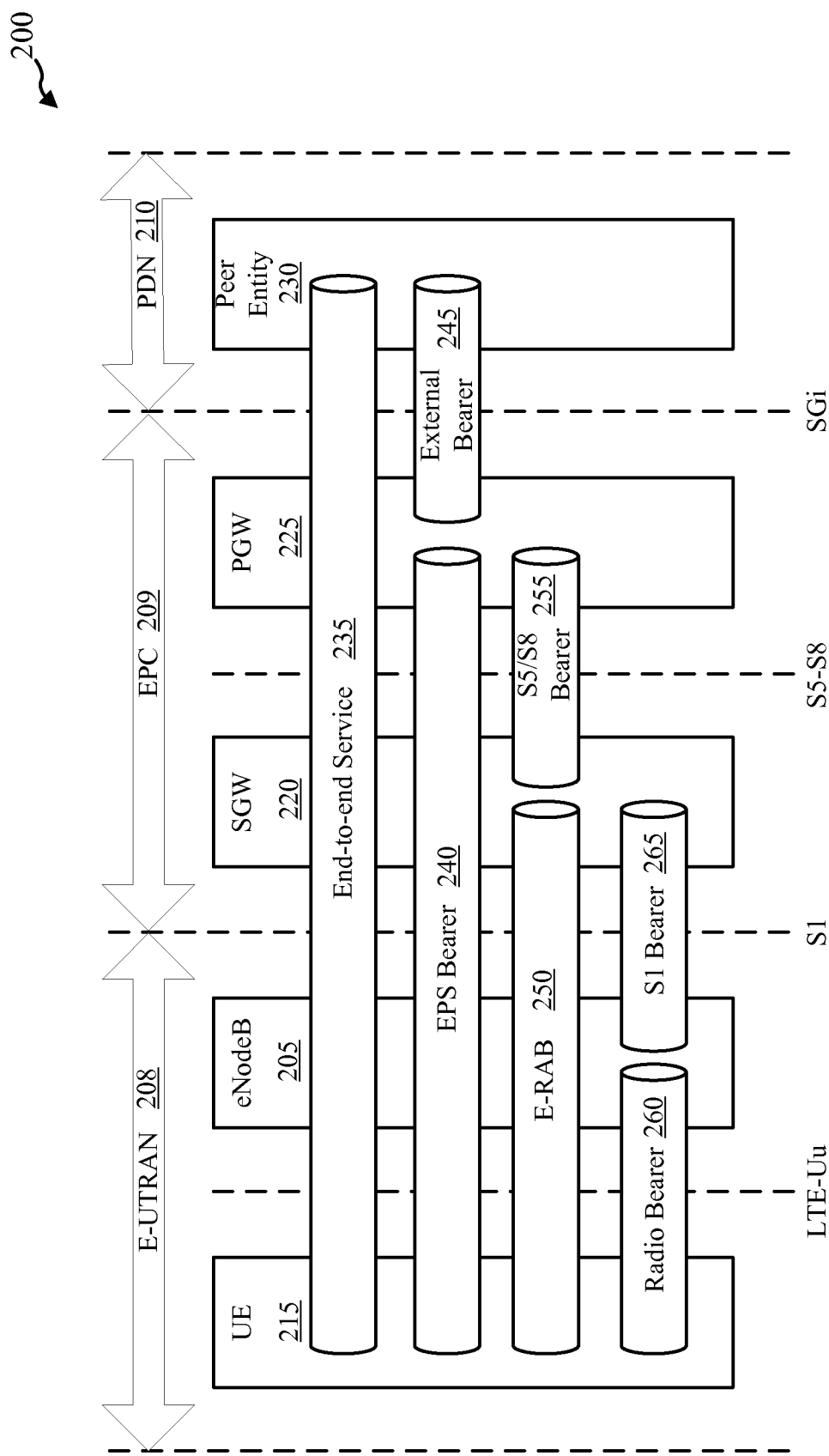
FIG. 2 is a block diagram conceptually illustrating an exemplary bearer architecture in a wireless communications system, in accordance with an aspect of the present disclosure.

FIG. 2 is a block diagram conceptually illustrating an exemplary bearer architecture in a wireless communications system 200, in accordance with an aspect of the present disclosure. The bearer architecture may be used to provide an end-to-end service 235 between a UE 215 and a peer entity 230 addressable over a network.

Aspects of the present disclosure provide techniques that may be used to avoid a UE attempting to access a first RAT network when end-to-end service 235 or EPS bearer 240 is not available, for example, packet data network (PDN) 210 is inaccessible. In some cases, PDNs 210 may be temporarily unavailable. In other cases, the access point names (APNs) used to identify the PDNs are blocked. A UE may detect such scenarios, by the occurrence of non-zero backoff timers for each APN with which is trying to attach.

The peer entity 230 may be a server, another UE, or another type of network-addressable device. The end-to-end service 235 may forward data between UE 215 and the peer entity 230 according to a set of characteristics (e.g., QoS) associated with the end-to-end service 235. The end-to-end service 235 may be implemented by at least the UE 215, an eNodeB 205, a serving gateway (SGW) 220, a packet data network (PDN) gateway (PGW) 225, and the peer entity 230. The UE 215 and eNodeB 205 may be components of an evolved UMTS terrestrial radio access network (E-UTRAN) 208, which is the air interface of the LTE/LTE-A systems. The serving gateway 220 and PDN gateway 225 may be components of an evolved Packet Core (EPC) 209, which is the core network architecture of LTE/LTE-A systems. The peer entity 230 may be an addressable node on a PDN 210 communicatively coupled with the PDN gateway 225.

The end-to-end service 235 may be implemented by an evolved packet system (EPS) bearer 240 between the UE 215 and the PDN gateway 225, and by an external bearer 245 between the PDN gateway 225 and the peer entity 230 over an SGi interface. The SGi interface may expose an internet protocol (IP) or other network-layer address of the UE 215 to the PDN 210.

The EPS bearer 240 may be an end-to-end tunnel defined to a specific QoS. Each EPS bearer 240 may be associated with a plurality of parameters, for example, a QoS class identifier (QCI), an allocation and retention priority (ARP), a guaranteed bit rate (GBR), and an aggregate maximum bit rate (AMBR). The QCI may be an integer indicative of a QoS class associated with a predefined packet forwarding treatment in terms of latency, packet loss, GBR, and priority. In certain examples, the QCI may be an integer from 1 to 9. The ARP may be used by a scheduler of an eNodeB 205 to provide preemption priority in the case of contention between two different bearers for the same resources. The GBR may specify separate downlink and uplink guaranteed bit rates. Certain QoS classes may be non-GBR such that no guaranteed bit rate is defined for bearers of those classes.

The EPS bearer 240 may be implemented by an E-UTRAN radio access bearer (E-RAB) 250 between the UE 215 and the serving gateway 220, and an S5/S8 bearer 255 between the serving gateway 220 and the PDN gateway over an S5 or S8 interface. S5 refers to the signaling interface between the serving gateway 220 and the PDN gateway 225 in a non-roaming scenario, and S8 refers to an analogous signaling interface between the serving gateway 220 and the PDN gateway 225 in a roaming scenario. The E-RAB 250 may be implemented by a radio bearer 260 between the UE 215 and the eNodeB 205 over an LTE-Uu air interface and by an S1 bearer 265 between the eNodeB and the serving gateway 220 over an S1 interface.

It will be understood that, while FIG. 2 illustrates the bearer hierarchy in the context of an example of end-to-end service 235 between the UE 215 and the peer entity 230, certain bearers may be used to convey data unrelated to end-to-end service 235. For example, radio bearers 260 or other types of bearers may be established to transmit control data between two or more entities where the control data is unrelated to the data of the end-to-end service 235.

Figure 3:
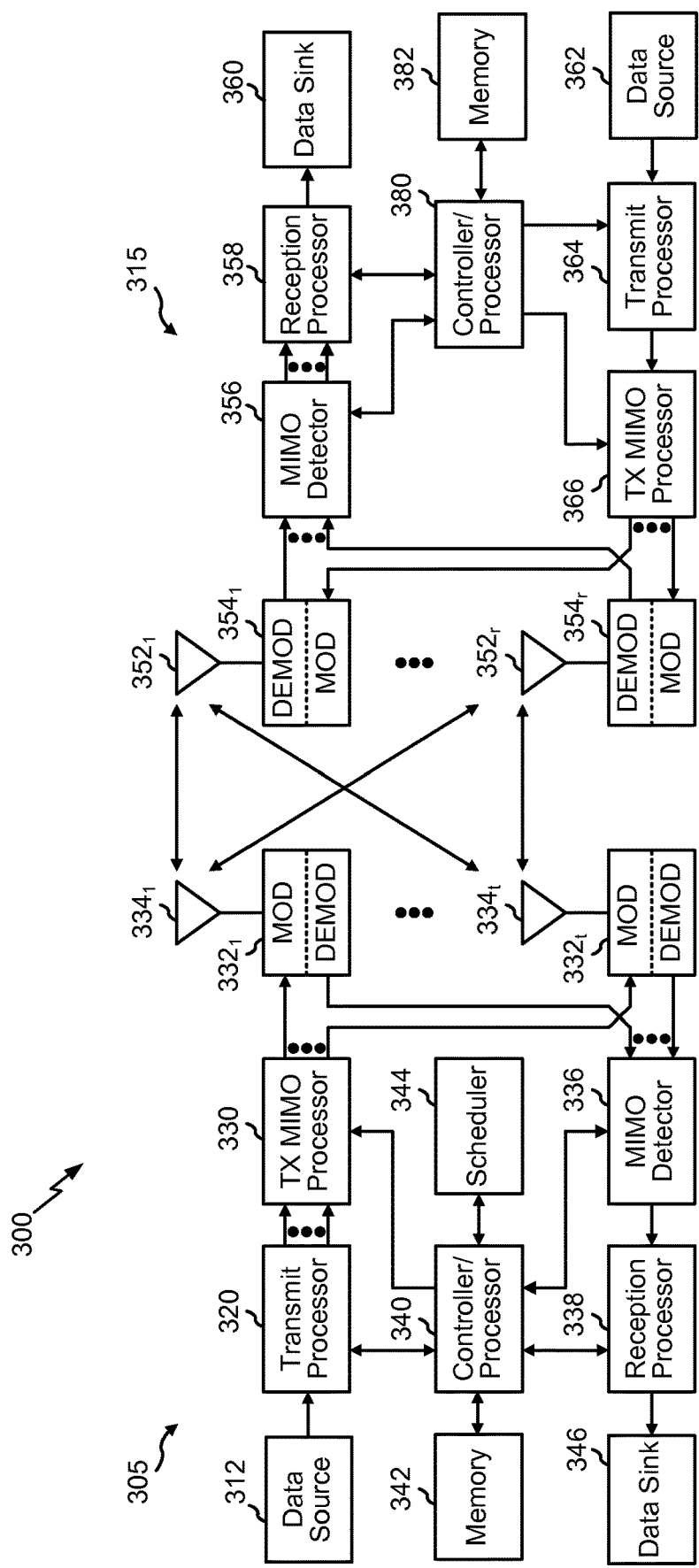
FIG. 3 is a block diagram conceptually illustrating an exemplary eNodeB and an exemplary UE configured in accordance with an aspect of the present disclosure.

FIG. 3 is a block diagram conceptually illustrating an exemplary eNodeB 305 and an exemplary UE 315 configured in accordance with an aspect of the present disclosure. For example, the UE 315 may be an example of the UE 115 shown in FIG. 1 and capable of operating in accordance with aspects of the present disclosure.

The base station 305 may be equipped with antennas $334_{1-t}$, and the UE 315 may be equipped with antennas $352_{1-r}$, wherein t and r are integers greater than or equal to one. At the base station 305, a base station transmit processor 320 may receive data from a base station data source 312 and control information from a base station controller/processor 340. The control information may be carried on the PBCH, PCFICH, PHICH, PDCCH, etc. The data may be carried on the PDSCH, etc. The base station transmit processor 320 may process (e.g., encode and symbol map) the data and control information to obtain data symbols and control symbols, respectively. The base station transmit processor 320 may also generate reference symbols, e.g., for the PSS, SSS, and cell-specific reference signal (RS). A base station transmit (TX) multiple-input multiple-output (MIMO) processor 330 may perform spatial processing (e.g., precoding) on the data symbols, the control symbols, and/or the reference symbols, if applicable, and may provide output symbol streams to the base station modulators/demodulators (MODs/DEMODs) $332_{1-t}$. Each base station modulator/demodulator 332 may process a respective output symbol stream (e.g., for OFDM, etc.) to obtain an output sample stream. Each base station modulator/demodulator 332 may further process (e.g., convert to analog, amplify, filter, and upconvert) the output sample stream to obtain a downlink signal. Downlink signals from modulators/demodulators $332_{1-t}$ may be transmitted via the antennas $334_{1-t}$, respectively.

At the UE 315, the UE antennas $352_{1-r}$, may receive the downlink signals from the base station 305 and may provide received signals to the UE modulators/demodulators (MODs/DEMODs) $354_{1-r}$, respectively. Each UE modulator/demodulator 354 may condition (e.g., filter, amplify, downconvert, and digitize) a respective received signal to obtain input samples. Each UE modulator/demodulator 354 may further process the input samples (e.g., for OFDM, etc.) to obtain received symbols. A UE MIMO detector 356 may obtain received symbols from all the UE modulators/demodulators $354_{1-r}$, and perform MIMO detection on the received symbols if applicable, and provide detected symbols. A UE reception processor 358 may process (e.g., demodulate, deinterleave, and decode) the detected symbols, provide decoded data for the UE 315 to a UE data sink 360, and provide decoded control information to a UE controller/processor 380.

On the uplink, at the UE 315, a UE transmit processor 364 may receive and process data (e.g., for the PUSCH) from a UE data source 362 and control information (e.g., for the PUCCH) from the UE controller/processor 380. The UE transmit processor 364 may also generate reference symbols for a reference signal. The symbols from the UE transmit processor 364 may be precoded by a UE TX MIMO processor 366 if applicable, further processed by the UE modulator/demodulators $354_{1-r}$ (e.g., for SC-FDM, etc.), and transmitted to the base station 305. At the base station 305, the uplink signals from the UE 315 may be received by the base station antennas 334, processed by the base station modulators/demodulators 332, detected by a base station MIMO detector 336 if applicable, and further processed by a base station reception processor 338 to obtain decoded data and control information sent by the UE 315. The base station reception processor 338 may provide the decoded data to a base station data sink 346 and the decoded control information to the base station controller/processor 340.

The base station controller/processor 340 and the UE controller/processor 380 may direct the operation at the base station 305 and the UE 315, respectively. The base station controller/processor 340 and/or other processors and modules at the base station 305 may perform or direct, e.g., the execution of various processes for the techniques described herein. The UE controller/processor 380 and/or other processors and modules at the UE 315 may also perform or direct, e.g., the execution of the functional blocks illustrated in FIGS. 4 and 5, and/or other processes for the techniques described herein. The base station memory 342 and the UE memory 382 may store data and program codes for the base station 305 and the UE 315, respectively. A scheduler 344 may schedule UEs 315 for data transmission on the downlink and/or uplink.

Example Techniques for Avoiding Transitions Between RATs When PDNs are Inaccessible In LTE, a UE needs to register with a network to receive certain services, via a procedure referred to as network attachment (or attach procedure). This attach procedure enables IP connectivity for the UE by establishing a default EPS bearer. In some cases, the attach procedure may also trigger procedures for establishing one or more dedicated EPS bearers for that UE. If the UE cannot activate the default bearer in LTE, then the UE cannot receive services via LTE and the UE may need to access another radio access technology (RAT) network to receive services.

As noted above, certain aspects of the present disclosure provide techniques which may help a UE avoid being switched between RATs, such as LTE and UMTS, when the UE cannot obtain service with one of the RATs. Such a scenario may arise, for example, due to temporary restrictions at all designated protocol data network (PDN) attach gateways associated with the RAT network. During this temporary restriction, a UE is blocked from using an APN associated with the PDN attach gateways.

In LTE, a UE is limited to using those "attach APNs" for registering with the RAT network, when all attach APNs are blocked, the UE is unable to register with the RAT network. As noted above, an APN is referred to as blocked when an attach request for that APN is rejected and is typically blocked for a period of time, specified in the rejection message (e.g., by a timer referred to as a T3396 timer). A UE is not allowed to attempt an attach procedure using the APN during this specified "back-off" time.

Aspects of the present disclosure recognize the scenario when all attach APNs are blocked and enable a UE to take action to prevent the UE from attempting to register with a corresponding RAT network. As noted above, a UE may be able to detect a scenario when all attach APNs have active (non-zero) back-off timers.

In other RAT networks, for example, in UMTS and GSM, there is no requirement to have at least one bearer to remain attached for service coverage. Thus, a UE may stay connected to ("camp on") a UMTS/GSM network for circuit switched (CS) service.

As noted above, an APN is the identifier of the PDN a UE wants to connect to. In a typical UE configuration, there is a set of APNs designated as "attach APNs" for LTE. These APNs can be configured by a user or operator and can be used to help define a policy that a UE can remain camped for full service in LTE only if some basic set of service are provided to the UE (by specifying attach APNs for only those PDNs with provide the basic set of services).

If all the attach APNs are blocked in LTE, then UE cannot perform attach procedure if the UE tries to attach to LTE network (e.g., it can recognize the LTE network, but is unable to successfully register for service) and UE will move to GSM/UMTS network. A conventional UE might then acquires GSM or UMTS service and complete successful registration for CS and PS domain with the operator network. Under certain conditions (e.g., if reference signal measurements indicate better radio coverage), the UE may reselect to LTE. This reselection may be initiated by the UE or by the operator network. In any case, the UE may attempt to reselect to the LTE network by sending a tracking area update (TAU) request. If there is an active PS call established in the GSM/UMTS network, a non-attach PDN may be available on LTE via re-selection and the UE may successfully transition to the LTE network.

Assuming no PS call (whether voice or data) is active (and no active PDP bearer), however, the LTE network will reject the request (e.g., with a cause code indicating a reason for the rejection) requiring the UE to perform an attach procedure. While the cause code may be designed to prompt the UE to perform the attach procedure, in this case, the UE cannot perform the attach procedure because all the attach APNs are blocked (e.g., with active back-off timers from previous failed attempts). Unable to acquire full service in LTE, the conventional UE would again acquire GSM/UMTS service and repeat the steps described above rapidly transitioning (ping-ponging) between GSM/UMTS and LTE networks.

Figure 4:
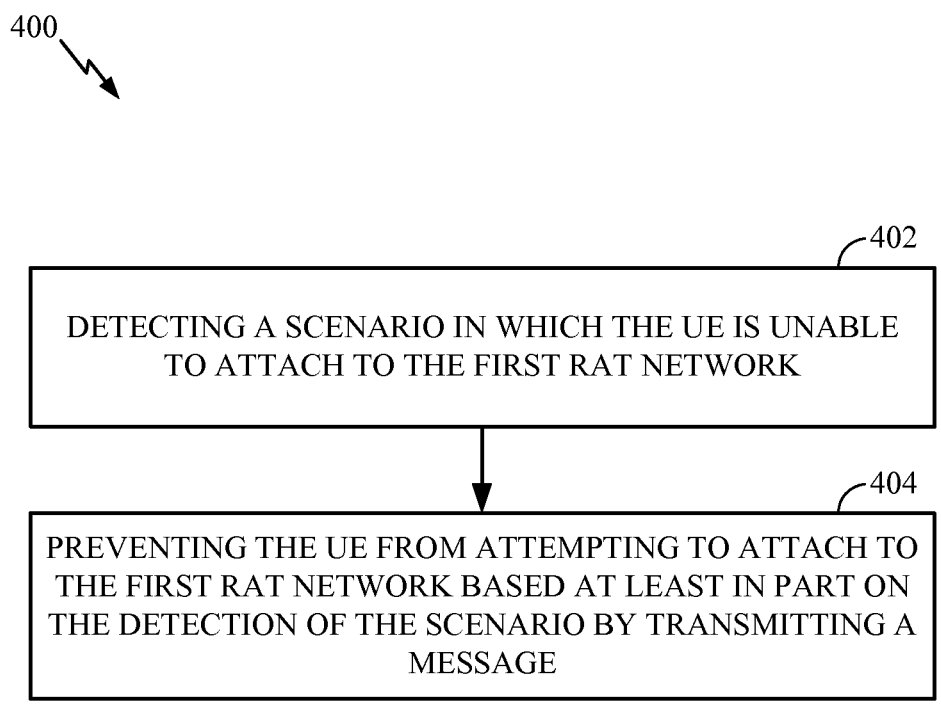
FIG. 4 illustrates an exemplary method for avoiding transitioning between different RAT networks, in accordance with an aspect of the present disclosure.

FIG. 4 illustrates an exemplary method 400 for avoiding transitioning between different RAT networks, in accordance with certain aspects of the present disclosure.

The method 400 begins, at 402, by detecting a scenario in which the UE is unable to attach to the first RAT network. As an example, a UE may detect a scenario in an LTE network where the PDNs are inaccessible for the UE to connect to on the LTE network. In some cases, a UE may be able to attach to the LTE network if there is an active PS call (in another network) even if all attach APNs are blocked. Therefore, the detection may also include detecting that there is no active PS call in the second RAT network when all attach APNs are blocked.

The method 400 continues, at 404, by preventing the UE from attempting to attach to the first RAT network in response to the detection. For example, the UE may inform the network that it does not support LTE (e.g., by sending a message with UE capability information), thereby preventing the UE from being directed to connect to the LTE network. As an alternative, or in addition, the UE may take action to disable UE-initiated selection of LTE (e.g., by temporarily updating state variables to indicate no support for LTE). Thus, these techniques may prevent the UE from wastefully attempting to attach to an LTE network by effectively removing LTE from a list of RATs supported by the UE when LTE is temporarily unavailable.

In some cases, the UE may later re-enable support for LTE (e.g., by sending a message with updated UE capability information), for example, if the UE detects a previously blocked attach APN has become unblocked. As described above, a non-attach PDN may be available on LTE via re-selection if there is an active PS call established in the GSM/UMTS network. Therefore, the UE may also re-enable support for LTE upon establishment of an active PS call in the GSM/UMTS network.

Figure 5:
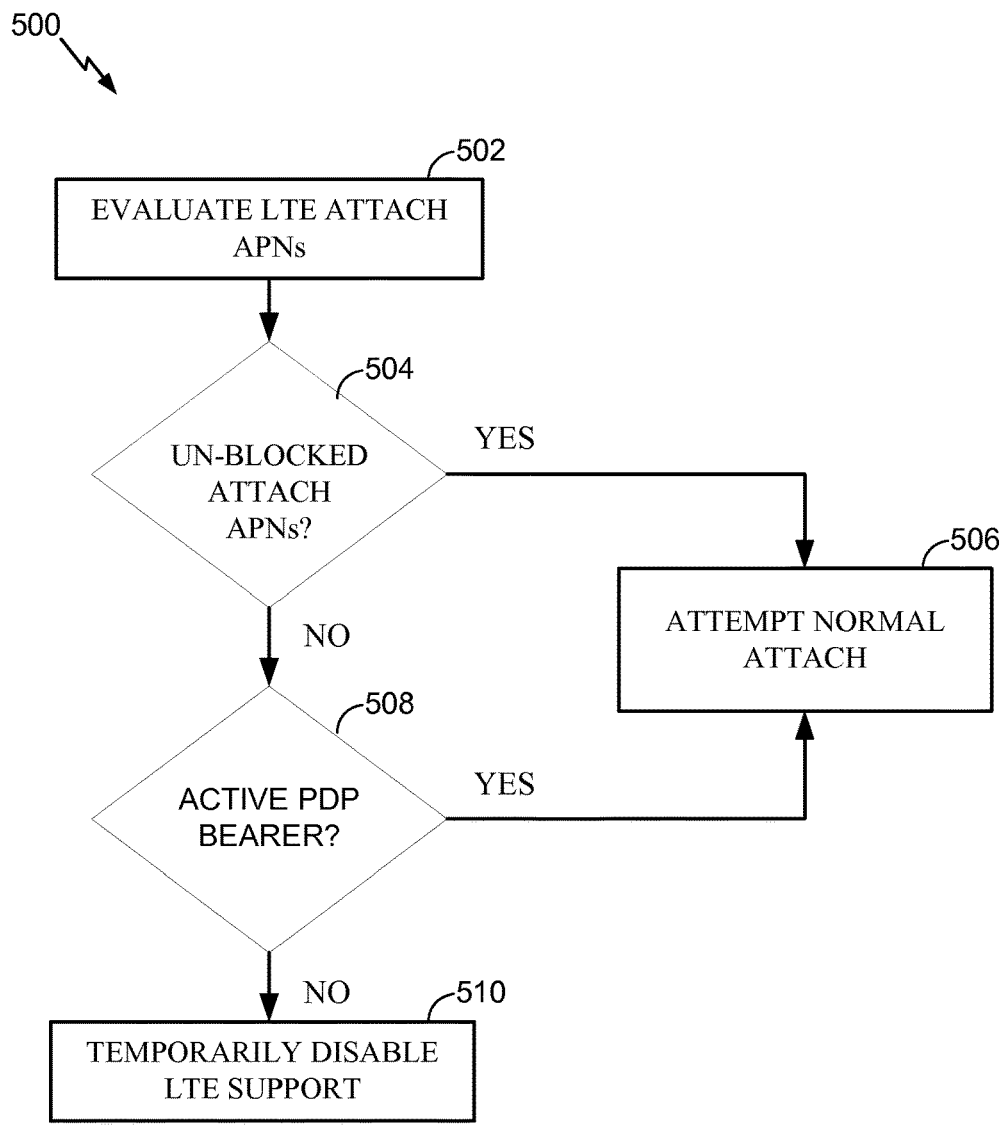
FIG. 5 illustrates a flow diagram for avoiding transitioning between different RAT networks, in accordance with an aspect of the present disclosure.

FIG. 5 illustrates a flow diagram 500 for avoiding transitioning between different RAT networks, in accordance with an aspect of the present disclosure. At 502, the UE evaluates APNs designated for attaching to LTE (attach APNs). For example, the UE may determine if there are any APNs with non-active back-off timers. If, as determined at 504, there are un-blocked attach APNs, or there is an active PDP bearer (an active PS call on GSM/UMTS), as determined at 508, a normal attach procedure may be performed at 506. Otherwise, the UE may temporarily disable LTE support, at 510.

Figure 6:
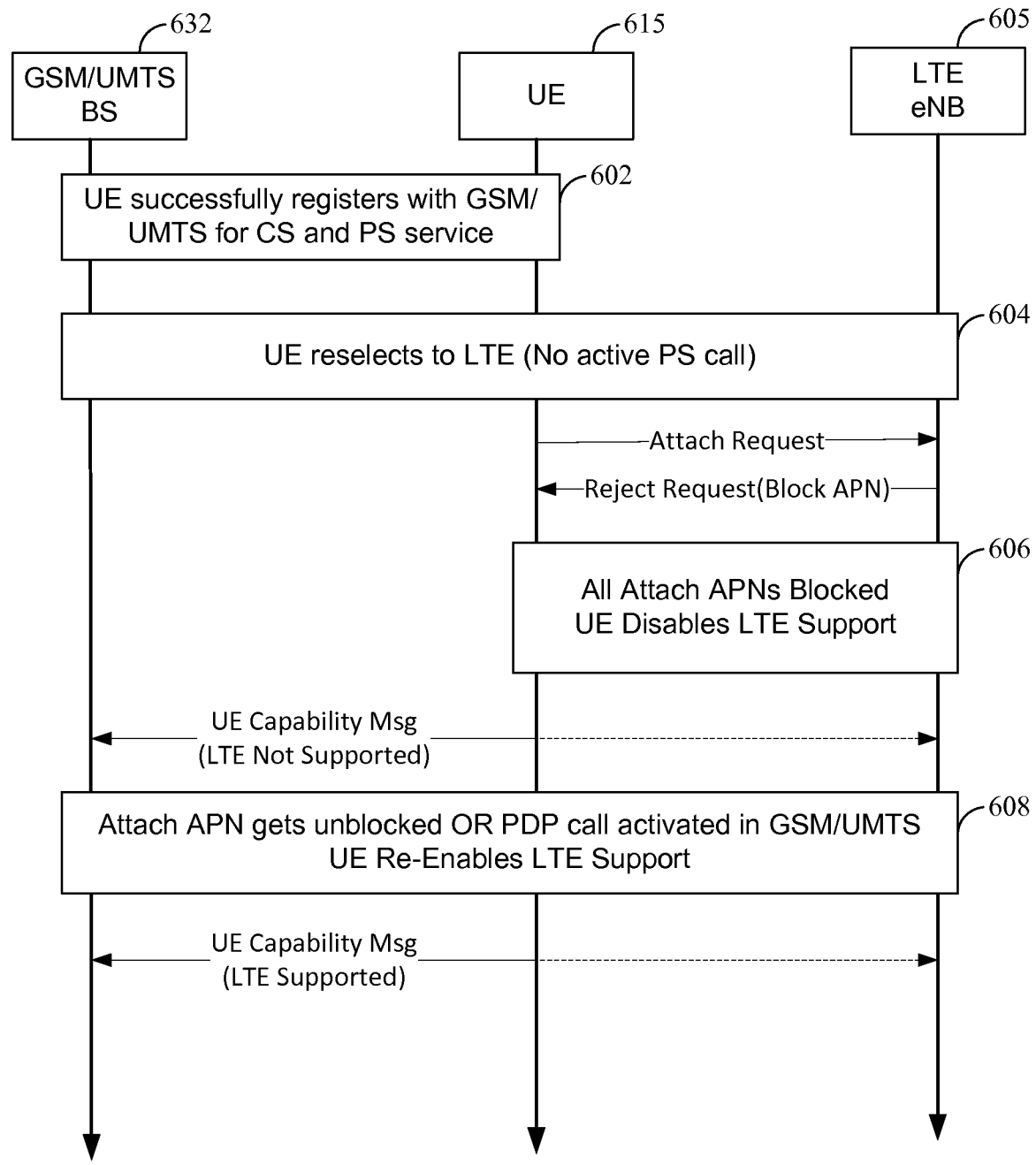
FIG. 6 illustrates an exemplary call flow diagram corresponding to the exemplary method of FIG. 5, in accordance with certain aspects of the present disclosure.

FIG. 6 illustrates an exemplary call flow diagram showing an exchange of communication between a UE 615, capable of operating in accordance with techniques presented herein, an LTE eNodeB 605, and a GSM/UMTS base station 632.

As illustrated, the UE 615 may first register with (camp on) the GSM/UMTS network at 602. The UE may then reselect to the LTE network at 604, for example, if reference signal measurement indicate better radio coverage in the LTE network. The illustrated example assumes there is no active PS call. As illustrated, the UE may attempt to attach to the LTE network (e.g., via a tracking area update-TAU), but this request may be rejected, with an indication of a back-off timer for a corresponding APN.

At 606, the UE determines all attach APNs are blocked and disables LTE support. As illustrated, the UE may disable LTE support by sending a message with UE capability information indicating LTE is not supported. This may prevent the UE from being redirected to the LTE network, even in cases where radio coverage in the LTE network might be favorable.

As illustrated at 608, in some cases, the UE may re-enable support for LTE. For example, the UE may detect an attach APN (previously blocked) has become unblocked or the existence of an active PS call established in the GSM/UMTS network (meaning a non-attach PDN may be available on LTE via re-selection). The UE may send a message with updated UE capability information, indicating support for LTE. This may again, allow the UE to be redirected to the LTE network.

As described herein, aspects of the present disclosure provide techniques that allow a UE to disable support for a given RAT network, in response to detecting that RAT network is not available to the UE. As a result, the UE may avoid repetitive switching between RAT networks, which may improve user experience.

While the techniques are described herein with reference to a UE capable of communicating in LTE and 3G networks (GSM and/or UMTS), the techniques presented herein may be applied in a variety of different RAT networks.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a mobile station and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a mobile station and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications performed by a user equipment (UE) capable of communicating using at least first and second radio access technology (RAT) networks, comprising:
    registering with the second RAT network;
    detecting, after registering with the second RAT network, that one or more attach Access Point Names (APNs) identifying one or more Packet Data Networks (PDNs) designated for the UE to use for attaching to the first RAT network are blocked and that there is no active packet switched (PS) call in the second RAT network when the one or more attach APNs are blocked; and
    preventing the UE, based at least in part on the detection, from being directed to attach to the first RAT network by transmitting, by the UE to a serving base station, a message indicating that the UE does not support the first RAT network.

2. The method of claim 1, further comprising disabling UE-initiated re-selection from the second RAT network to the first RAT network.

3. The method of claim 1, further comprising:
    detecting the UE is able to attach to the first RAT network; and
    in response, transmitting a message with UE capability information with an indication of support for the first RAT.

4. The method of claim 3, wherein detecting the UE is able to attach to the first RAT network comprises detecting at least one of:
    an active packet-switched (PS) call on the second RAT network; or
    an availability of one or more packet data networks (PDNs) designated for the UE to use for attach to the first RAT network that were previously unavailable.

5. The method of claim 1, wherein the first RAT network comprises a long term evolution (LTE) network.

6. The method of claim 5, wherein the second RAT network comprises at least one of a Global System for Mobile Communications (GSM) network or a Universal Mobile Telecommunication System (UMTS) network.

7. A user equipment (UE) for wireless communications capable of communicating using at least first and second radio access technology (RAT) networks, comprising:
    at least one processor configured to:
        register with the second RAT network;
        detect, after registering with the second RAT network, that one or more attach Access Point Names (APNs) identifying one or more Packet Data Networks (PDNs) designated for the UE to use for attaching to the first RAT network are blocked and that there is no active packet switched (PS) call in the second RAT network when the one or more attach APNs are blocked; and
        prevent the UE, based on the detection, from being directed to attach to the first RAT network by transmitting to a serving base station a message indicating that the UE does not support the first RAT network; and
    a memory coupled with the at least one processor.

8. The UE of claim 7, wherein the at least one processor is further configured to disable UE-initiated re-selection from the second RAT network to the first RAT network.

9. The UE of claim 7, wherein the at least one processor is further configured to:
    detect the UE is able to attach to the first RAT network; and
    in response, transmit a message with UE capability information with an indication of support for the first RAT.

10. The UE of claim 9, wherein the at least one processor is configured to detect the UE is able to attach to the first RAT network by detecting at least one of:
    an active packet-switched (PS) call on the second RAT network; or
    an availability of one or more packet data networks (PDNs) designated for the UE to use for attach to the first RAT network that were previously unavailable.

11. The UE of claim 7, wherein the first RAT network comprises a long term evolution (LTE) network.

12. The UE of claim 11, wherein the second RAT network comprises at least one of a Global System for Mobile Communications (GSM) network or a Universal Mobile Telecommunication System (UMTS) network.

13. A user equipment (UE) for wireless communications capable of communicating using at least first and second radio access technology (RAT) networks, comprising:
- means for registering with the second RAT network;
- means for detecting, after registering with the second RAT network, that one or more attach Access Point Names (APNs) identifying one or more Packet Data Networks (PDNs) designated for the UE to use for attaching to the first RAT network are blocked and that there is no active packet switched (PS) call in the second RAT network when the one or more attach APNs are blocked; and
- means for preventing the UE, based at least in part on the detection, from being directed to attach to the first RAT network by transmitting to a serving base station a message indicating that the UE is does not support the first RAT network.

14. The UE of claim 13, further comprising means for disabling UE-initiated re-selection from the second RAT network to the first RAT network.

15. The UE of claim 13, further comprising:
- means for detecting the UE is able to attach to the first RAT network; and
- means for transmitting, in response, a message with UE capability information with an indication of support for the first RAT.

16. A non-transitory computer readable medium for wireless communications by a user equipment (UE) capable of communicating using at least first and second radio access technology (RAT) networks, the non-transitory computer readable medium having instructions stored thereon for:
- registering with the second RAT network;
- detecting, by the UE after registering with the second RAT network, that one or more attach Access Point Names (APNs) identifying one or more Packet Data Networks (PDNs) designated for the UE to use for attaching to the first RAT network are blocked and that there is no active packet switched (PS) call in the second RAT network when the one or more attach APNs are blocked; and
- preventing the UE, based at least in part on the detection, from being directed to attach to the first RAT network by transmitting, by the UE to a serving base station, a message indicating that the UE does not support the first RAT network.

17. The non-transitory computer readable medium of claim 16, further comprising instructions for disabling UE-initiated re-selection from the second RAT network to the first RAT network.

18. The non-transitory computer readable medium of claim 16, wherein the instructions further comprise instructions for:
- detecting the UE is able to attach to the first RAT network; and
- in response, transmitting a message with UE capability information with an indication of support for the first RAT.

* * * * *